Patented Dec. 25, 1951

2,579,572

UNITED STATES PATENT OFFICE 2,579,572

MANUFACTURE OF VINYL RESIN COMPOSITIONS

John G. Hendricks, Chatham, N. J., assignor to National Lead Company, New York, N. Y., a corporation of New Jersey No Drawing. Application June 27, 1950, Serial No. 170,705

5 Claims. (Cl. 260—45.7)

This invention relates to vinyl chloride resin compositions and more particularly to such compositions stabilized against the action of light, and to an improved method for making such composition.

Vinyl resin compositions are often subject during processing and use to the action of heat and also light which tend to discolor, embrittle and otherwise degrade the product. The prior art has proposed employment of stabilizing agents to prevent or inhibit these effects for example litharge, white lead, lead sulphate, strontium naphthenate and other metallic organic salts. Such stabilizing agents, however, have not provided a satisfactory stabilizing action particularly against the action of light. Moreover, many of these stabilizers impart opacity to the product and cannot be employed when clear or translucent bodies are desired.

It is therefore the object of this invention to produce a vinyl chloride resin composition stable against the action of light. A further object is to produce a clear vinyl resin composition resistant to the action of heat as well as stable to light. Another object of the invention is to provide a stabilizer composition containing a lubricant which when employed in compounding vinyl resin compositions produces superior qualities in those compositions. These and other objects of this invention will be apparent from the following more complete description thereof.

This invention, in its broadest aspects, contemplates provision of a vinyl chloride resin composition containing from 0.5 to 10 parts by weight of a compound selected from the group consisting of sodium phosphite and potassium phosphite. In addition to the vinyl resin and phosphite salt components, the composition may also contain plasticizers, coloring and modifying agents and if desired other stabilizing agents. In a more specific and restricted embodiment this invention contemplates forming a sodium or potassium phosphite intermediate product containing a lubricant soap such as for instance barium ricinoleate which when added to and mixed with the other ingredients results in improved processing conditions and a superior product.

The vinyl chloride resin employed in the practice of this invention may comprise polyvinyl chloride and resins produced by conjoint polymerization of this compound with vinyl acetate or other vinyl ester, with an acrylic compound for instance ethyl or methyl methacrylate or with other vinyl resin copolymers as for instance vinylidene halide. The sodium phosphite employed in the practice of this invention may consist of the dehydrated salt $Na_2HPO_3$ or the originally hydrated salt $Na_2HPO_3.5H_2O$. Best results are obtained when the salt is partially dehydrated and contains about 20 to 30% $H_2O$ compared to 41.7% in the pentahydrate. Potassium phosphite exists ordinarily only in the anhydrous form and is suitable for use in the compositions described in this state.

As an illustration of the formulation of compositions according to this invention, the following example is shown:

Example 1

The following ingredients were roughly premixed, then mixed in a five minute cycle on a two roller mill heated at 250° F. A 12 mil film was sheeted from the mill and found to be substantially clear:

| | Parts |
|---|---|
| Polyvinylchloride-acetate | 65 |
| Dioctyl phthalate plasticizer | 35 |
| Barium ricinoleate lubricant | 1.625 |
| Sodium phosphite | 1.625 |

The product of this example shown above, was tested by exposure to a testing device which included an ultraviolet light and the product of Example 1 showed stability towards light without color breakdown for a period of more than 4500 hours. Compositions similar to that of Experiment 1, except that the sodium phosphite was placed with an equivalent proportion of dibutyl tin dilaurate, cadmium 2-ethyl hexoate or dibasic lead phosphite, previously known and used stabilizers, showed light stability under duplicated conditions of test for 850, 475 and 2,000 hours respectively. The composition including dibasic lead phosphite, however, was opaque and not clear and therefore suffers from a disadvantage when employed in applications for which the composition of the instant invention, being substantially clear, is ideally suited. Tests in which potassium phosphate was substituted for sodium phosphite have shown equivalent results.

While Example 1 has shown a general method of producing the composition of this invention which will be substantially clear and stable towards light, it is preferred to first make a separate mixture of the barium ricinoleate and the sodium phosphite components and then add to this mixture the vinyl chloride constituents and other components of the final resin composition. This method of combining is advantageous in that the barium ricinoleate acts with the sodium phosphite to inhibit or prevent processing difficulties and product imperfections caused by the presence of moisture in the mixture. Just why this occurs is not precisely known but it is postulated that when the sodium phosphite and barium ricinoleate are first mixed together, these constituents are closely associated and are in intimate contact even in the total mixture and the coaction between them results in more efficient processing which cannot be obtained when these ingredients are separately added as ingredients in the total batch.

As an example of the preferred method of forming the compositions of this invention, the following is shown:

Example 2

An intimate mixture containing equal parts of sodium phosphite (25% water of crystallization) and barium ricinoleate, both about 200 mesh, was formed by intensively blending these ingredients in a ribbon blender.

A batch was then formed by incorporating sufficient of the above mixture with vinyl resin and plasticizer to form a final mixture as follows:

| | Parts |
|---|---|
| Polyvinychloride-acetate | 65 |
| Dioctyl phthalate plasticizer | 35 |
| Sodium phosphite-barium ricinoleate mixture | 3.25 |

These ingredients were incorporated and mixed on a heated two roller mill and then sheeted to form a 12 mil film. The so-produced film was free from pin holes and bubbles and no sticking or processing difficulties were encountered. The product was characterized by clarity and light stability comparable to that of the product of Example 1.

Both sodium and potassium phosphite have great affinity for moisture and it is almost impossible to maintain such compounds in bone-dry condition. When moisture is absorbed by such compounds when incorporated in a vinyl resin such as contemplated herein, the composition exhibits a characteristic stickiness causing sticking to processing machinery or rolls employed in sheeting and calendering. The lubricant soap prevents sticking to an effective degree and its presence is especially advantageous when it is formed into an intermediate intimate mixture with the phosphite salt. In addition, the presence of moisture may result in pin holes or bubbles when the composition is sheeted or calendered over hot rolls and the preferred method of this invention in which the soap and phosphite are first premixed and then added to and mixed with the vinyl resin and other ingredients is particularly effective in preventing this difficulty. It appears that the moisture associated with the phosphite particles is absorbed or otherwise rendered innocuous by the soap particles in close proximity.

The mixture of phosphite and soap should be intimate and it is preferred to employ these constituents in finely divided form, advantageously of the order of 200 mesh, and to blend or mix thoroughly. An intensive mixing device, for instance, a ribbon blender may be employed for this purpose.

While the intermediate product, that is the mixture of barium ricinoleate and sodium phosphite, has been described and its utility discussed, it is not intended to be strictly limited to containing barium ricinoleate but this compound may be replaced by other known agents selected generally from the group consisting of lead, sodium and barium salts of long chain fatty acids containing at least 10 carbon atoms which produce a lubricating effect during mixing of the final resin batch. The intermediate product containing this ingredient and the sodium or potassium phosphite should contain these elements in proportion so that for each part of phosphite there are present from 0.1 to 3 parts of soap.

The preferred compositions of this invention are characterized by being substantially clear. This is particularly evident when the material is formed into sheets or relatively thin bodies. While a mass of the composition of great thickness may be considered more as translucent than clear, the composition may be considered as clear as this term is known in the art. In addition, the compositions of this invention have good heat stability and excellent light stability as shown in the comparative tests described above.

While this invention has been described and illustrated by the example shown, it is not intended to be strictly limited thereto and other modifications and variations may be employed within the scope of the following claims:

1. A method for producing a light stable vinyl chloride resin composition which comprises first forming an intimate mixture of a finely-divided salt selected from the group consisting of sodium phosphite and potassium phosphite and barium ricinoleate in proportion so that for each part of salt there are present from 0.1 to 3 parts of barium ricinoleate and subsequently incorporating this mixture in a vinyl chloride resin composition in proportion so that the amount of phosphite salt present in the final composition will be from 0.5 to 10 parts by weight.

2. A method for producing a light stable vinyl chloride resin composition which comprises first forming an intimate mixture of a finely divided sodium phosphite and barium ricinoleate in proportions to that for each part of sodium phosphite there are present from 0.1 to 3 parts of barium ricinoleate and subsequently incorporating this mixture in a vinyl chloride resin composition in proportion so that the amount of phosphite salt present in the final composition will be from 0.5 to 10 parts by weight.

3. A method for producing a light stable vinyl chloride resin composition which comprises first forming an intimate mixture of a finely-divided sodium phosphite containing 20 to 30% water of crystallization and barium ricinoleate in proportion so that for each part of sodium phosphite there are present from 0.1 to 3 parts of barium ricinoleate and subsequently incorporating this mixture in a vinyl chloride resin composition in proportion so that the amount of phosphite salt present in the final composition will be from 0.5 to 10 parts by weight.

4. A light stabilizer for incorporation in vinyl chloride resin compositions comprising an intimate mixture of a salt selected from the group consisting of sodium phosphite and potassium phosphite and a barium ricinoleate in proportion so that for each part of salt there are present from 0.1 to 3 parts of barium ricinoleate.

5. A light stabilizer for incorporation in vinyl chloride resin compositions comprising an intimate mixture of sodium phosphite and barium ricinoleate in proportion so that for each part of sodium phosphite there are present from 0.1 to 3 parts of barium ricinoleate.

JOHN G. HENDRICKS.

REFERENCES CITED

The following references are of record in the file of this patent:

UNITED STATES PATENTS

| Number | Name | Date |
|---|---|---|
| 2,456,231 | Wiley | Dec. 14, 1948 |
| 2,487,746 | Wood et al. | Nov. 8, 1949 |

OTHER REFERENCES

Modern Plastics, April 1950, vol. 27, No. 8, page 10.